Aug. 30, 1966       D. S. WILLARD       3,270,217
SWITCHING SYSTEM
Filed Nov. 4, 1963
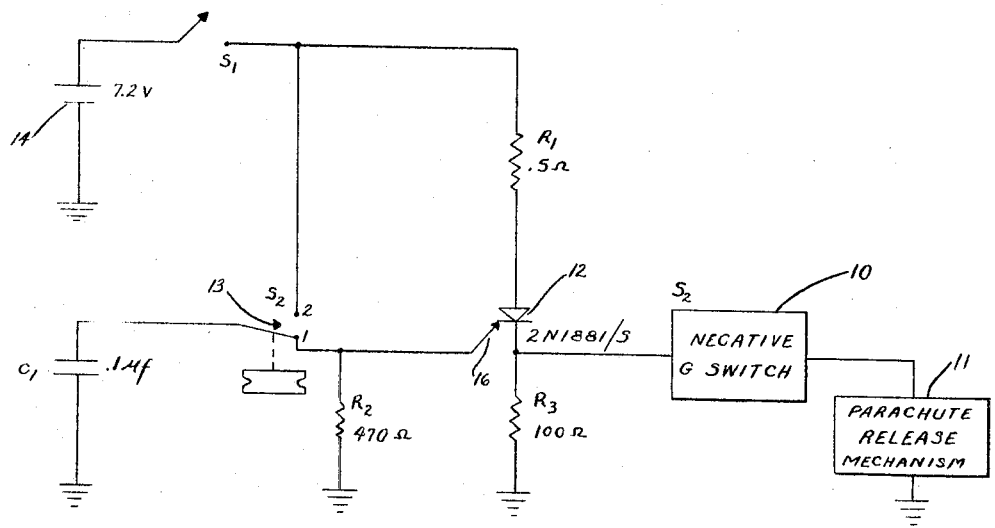
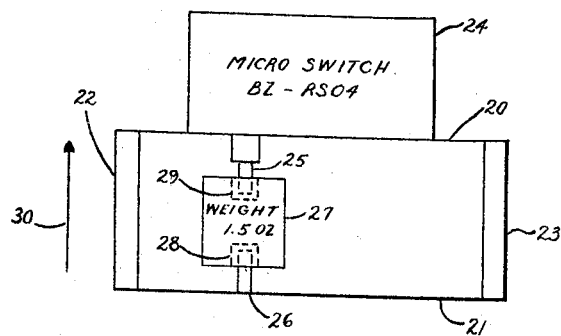
INVENTOR.
DAVID S. WILLARD

United States Patent Office

3,270,217
Patented August 30, 1966

3,270,217
SWITCHING SYSTEM
David S. Willard, High Rolls, N. Mex., assignor to the United States of America as represented by the Secretary of the Air Force
Filed Nov. 4, 1963, Ser. No. 321,376
3 Claims. (Cl. 307—118)

The invention described herein may be manufactured and used by or for the United States Government for governmental purposes without payment to me of any royalty thereon.

This invention relates to a switching system which may be used to operate the recovery parachute release for a balloon-borne payload.

One object of the invention is to provide a switching system for use in operating the recovery parachute release for a balloon-borne payload which operates automatically during the mission, to prevent operation of the release until the apparatus has ascended above a predetermined altitude and has then again descended below said predetermined altitude.

Another object of the invention is to provide a switching system for use in operating the recovery parachute release for a balloon-borne payload which will operate on the recoil from landing impact or by a shock caused by parachute drag.

These and other objects will be more fully understood from the following detailed description taken with the drawing wherein, FIG. 1 shows a circuit schematic for the switching system of the invention, and FIG. 2 shows one arrangement which may be used for the negative-G switch of the device of FIG. 1.

Referring now to the drawing, reference number 10 refers to a switch which closes upon the recoil from landing impact of the balloon load with the ground or the shock caused by parachute drag to complete the circuit to parachute release operating device 11. This switch should be such as to require several G's for closure to prevent closure for any air-borne or parachute condition. The switch 10 may be any commercially available negative-G switch meeting this requirement. One such switch is shown in FIG. 2. A controlled silicon rectifier 12 is connected in the arming circuit for switch 10. The controlled silicon rectifier 12 is normally off until switched on by the electrical charge on capacitor $C_1$ applied through an aneroid actuated switch 13. An arming switch $S_1$ is supplied between the power supply 14 and the silicon controlled rectifier 12 and the associated circuitry. A current limiting resistor $R_1$ is connected between the power supply 14 and the silicon controlled rectifier 12.

The negative-G switch shown in FIG. 2 has two parallel mounting plates 20 and 21 separated by two spacer members 22 and 23. A microswitch 24 is mounted upon plate 20 so that its operating plunger 25 extends down through plate 20. A guide pin 26 is secured to the plate 21. A mass 27 having holes 28 and 29 therein is mounted between the guide pin 26 and plunger 25 with the pin 26 and plunger 25 extending into the holes 28 and 29 respectively. The end of plunger 25 and pin 26 are spaced to permit free movement of mass 27.

In the operation of the device of the invention, arming is accomplished by closure of switch $S_1$. The controlled rectifier 12 is off and no current is supplied to the parachute release mechanism 11.

When the device ascends to a predetermined altitude for which the aneroid switch 13 is set to operate, for example, 15,000 feet, switch 13 is moved to position 2 and the condenser $C_1$ becomes charged. When the balloon load is released and descends by parachute to the aneroids predetermined switch altitude, switch 13 returns to position 1 thus applying the charge voltage of $C_1$ to the control terminal 16 of the controlled rectifier to switch rectifier 12 to its conducting state. With switch 10 still open, conduction current for rectifier 12 is maintained through $R_3$. Upon recoil from impact or shock from parachute drag, switch 10 closes thus closing the circuit through the parachute release operating device 11.

The negative-G switch can operate only following an upward acceleration. The negative-G switch will not encounter an upward acceleration in normal flight after the parachute opens and descends to the predetermined altitude. However, upon the recoil from impact or on parachute drag, the negative-G switch 10 experiences an acceleration in the direction shown by the arrow 30 in FIG. 2. When this motion stops such as when the load again starts downward or when the load strikes an obstacle, the mass 27 continues in the direction of arrow 30 and operates microswitch 24. The particular parachute release used forms no part of this invention; however, various devices may be used, for example, a squib-operated release mechanism.

Though the switching system has been described for use in operating a parachute release mechanism, the device may be used to perform other functions. Also, for other uses, other types of switches for example a ground impact switch could be substituted for the negative-G switch.

There is thus provided an automatic switching system for use in releasing a parachute from a payload.

While a certain specific embodiment has been described, it is obvious that numerous changes may be made without departing from the general principle and scope of the invention.

I claim:
1. A switching system for operating a parachute release mechanism, comprising, a controlled rectifier having a cathode, an anode and a gate electrode, a D.C. power supply means for connecting said D.C. power supply across the anode-cathode circuit of said controlled rectifier, a condenser, aneroid switch means for connecting said condenser to said power supply above a predetermined altitude and to said gate electrode below said predetermined altitude, whereby said condenser is charged when the device ascends above said altitude and said condenser charge is applied to said gate electrode when the device descends below said altitude, a parachute release mechanism load connected to said controlled rectifier, and means, connected between said controlled rectifier and said load for energizing said load upon recoil from impact with the ground.

2. A switching system for operating a parachute release mechanism, comprising; a controlled rectifier having a cathode, an anode and a gate electrode; a D.C. power supply; means for connecting said D.C. power supply across the anode-cathode circuit of said controlled rectifier; a condenser; aneroid switch means for connecting said condenser to said power supply above a predetermined altitude and to said gate electrode below said predetermined altitude, whereby said condenser is charged when the device ascends above said altitude and said condenser charge is applied to said gate electrode when the device descends below said altitude; means for limiting the current flow through said controlled rectifier; a parachute release mechanism load connected in the anode circuit of said controlled rectifier; a switch connected between said anode and said load for energizing said load following a negative acceleration of said switch; and means, connected in the anode circuit of said controlled rectifier, for maintaining conduction in said controlled rectifier until said switch is operated.

3. A switching system for operating a parachute release mechanism, comprising: a controlled rectifier having a cathode, an anode and a gate electrode; a D.C. power supply; means for connecting said D.C. power supply across the anode-cathode circuit of said controlled rectifier; a condenser; aneroid switch means for connecting said condenser to said power supply above a predetermined altitude and to said gate electrode below said predetermined altitude, whereby said condenser is charged when the device ascends above said altitude and said condenser charge is applied to said gate electrode when the device descends below said altitude; a current limiting resistor connected in the cathode circuit of said controlled rectifier; a parachute release mechanism load connected in the anode circuit of said controlled rectifier; a negative-G switch connected between said anode and said load; and means connected in the anode circuit of said controlled rectifier, for maintaining conduction in said controlled rectifier until said switch is operated.

No references cited.

ORIS L. RADER, *Primary Examiner.*

T. B. JOIKE, *Assistant Examiner.*